No. 608,074. Patented July 26, 1898.
W. R. PHILLIPS.
HARNESS ATTACHMENT.
(Application filed July 23, 1897.)
(No Model.)
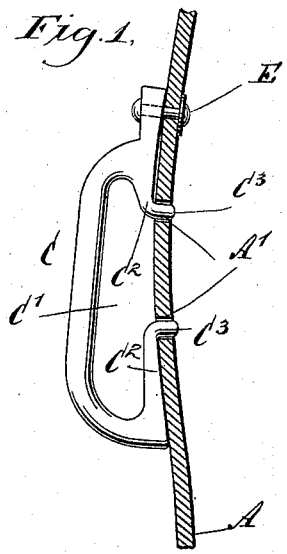
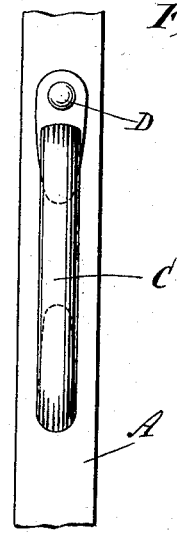
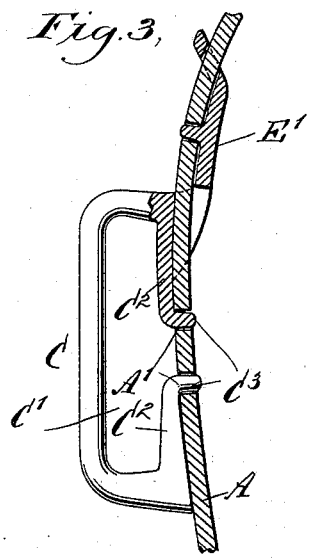
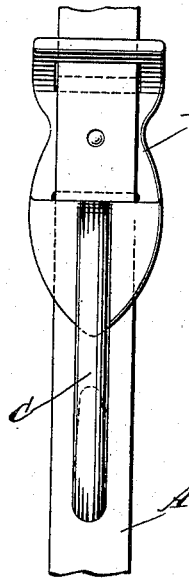
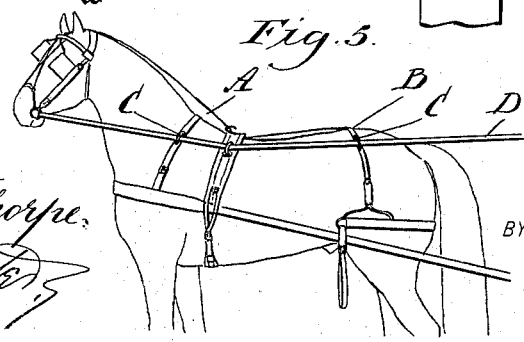
WITNESSES:
Edward Thorpe
Rev. G. Hoster
INVENTOR
W. R. Phillips.
BY
ATTORNEYS.

UNITED STATES PATENT OFFICE.

WILLIAM R. PHILLIPS, OF POMONA, CALIFORNIA, ASSIGNOR TO HIMSELF AND GEORGE W. OGLE, OF SAME PLACE.

HARNESS ATTACHMENT.

SPECIFICATION forming part of Letters Patent No. 608,074, dated July 26, 1898.

Application filed July 23, 1897. Serial No. 645,697. (No model.)

*To all whom it may concern:*

Be it known that I, WILLIAM RILEY PHILLIPS, of Pomona, in the county of Los Angeles and State of California, have invented a new and Improved Harness Attachment, of which the following is a full, clear, and exact description.

The object of the invention is to provide a new and improved harness attachment which is simple and durable in construction, readily applied to old or new harness, and arranged to at all times hold the lines in proper position, so as to prevent entanglement of the line with other parts or entanglement of the horse's tail in the line.

The invention consists of certain parts and details and combinations of the same, as will be fully described hereinafter and then pointed out in the claims.

Reference is to be had to the accompanying drawings, forming a part of this specification, in which similar characters of reference indicate corresponding parts in all the figures.

Figure 1 is a cross-section of one of the straps with the attachment applied. Fig. 2 is a front elevation of the same. Fig. 3 is a cross-section of a modified form of the device for fastening the attachment to the strap. Fig. 4 is a front elevation of the same, and Fig. 5 is a perspective view of the improvement as applied.

As illustrated in Fig. 5, the neck-strap A and the hip-strap B of the harness are both provided on each side with an attachment C for supporting the lines D, the said attachment being fastened either by a rivet E or by a buckle E' to the corresponding strap, as is plainly indicated in Figs. 1 and 3. The attachment C is in the form of a loop C', having its opening extending longitudinally for the passage of the lines D, and the rear member of the said loop is split or separated so as to form an opening for the entrance or removal of the lines to and from the loop C'. The ends of the rear member C² of the loop are formed with projections or lugs C³, extending transversely to engage corresponding apertures or holes A', formed in the strap A, or similar holes formed in the strap B. Thus when the attachment is in a normal position, as shown in Figs. 1 and 3, then the loop-opening is completely closed, so that the lines D cannot leave the loops, and the latter serve to hold the lines in proper position, as is plainly shown in Fig. 5, so that the lines are not liable to become entangled with the harness parts, nor is the tail of the animal liable to become entangled with the lines.

Now when it is desired to place the lines in position on the attachment without pulling through lengthwise then the operator simply lifts the attachment forwardly or moves the strap A slightly rearwardly to disengage the lugs C³ from the apertures A' and to move the rear member C² of the loop sufficiently away from the strap to allow of sliding the line D upwardly between the rear member and the strap, to finally pass it through the opening in the rear member into the loop. When this has been done, the two parts—that is, the loop and the strap—are again released to allow the same to move back into their forward position, as shown in Figs. 1 and 3. The line is thus securely held in the loop, but is free to move forward or backward, according to the pull or release given by the driver. In removing the line from the attachment without drawing the line through the same I repeat the above operation—that is, slightly separate the rear member and the strap from each other or slide the line through the opening in the rear member between the latter and the strap to the outside.

It is evident that I do not limit myself to the peculiar means shown and described for fastening the attachment to the straps, as any suitable device may be employed.

Having thus fully described my invention, I claim as new and desire to secure by Letters Patent—

1. A harness attachment, comprising a loop provided at one end with means for securing it to a strap, and having its rear member split or separated to form an opening for the entrance or removal of a line, and provided with lugs for engaging apertures in the strap to which the loop is attached, substantially as described.

2. A harness attachment, comprising a loop provided at one end with an extension for securing it to a strap, said loop having its rear member split or separated to form an opening for the entrance or removal of the line, the ends of the said rear member terminating in outwardly-projecting lugs for engaging apertures in the strap to which the loop is attached, substantially as described.

WILLIAM R. PHILLIPS.

Witnesses:
R. S. BASSETT,
FRED. J. SMITH.